US012597733B2

(12) United States Patent
Komatsu

(10) Patent No.: US 12,597,733 B2
(45) Date of Patent: Apr. 7, 2026

(54) SHIELD WIRE ASSEMBLY

(71) Applicant: Tyco Electronics Japan G.K., Kawasaki (JP)

(72) Inventor: Seiji Komatsu, Toyota (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 339 days.

(21) Appl. No.: 18/365,506

(22) Filed: Aug. 4, 2023

(65) Prior Publication Data

US 2024/0047917 A1 Feb. 8, 2024

(30) Foreign Application Priority Data

Aug. 4, 2022 (JP) ................................. 2022-124465

(51) Int. Cl.
*H01R 13/52* (2006.01)
*H01R 13/6592* (2011.01)

(52) U.S. Cl.
CPC ..... *H01R 13/5205* (2013.01); *H01R 13/6592* (2013.01)

(58) Field of Classification Search
None
See application file for complete search history.

(56) References Cited

U.S. PATENT DOCUMENTS

| | | | | |
|---|---|---|---|---|
| 5,618,190 A | 4/1997 | Masuda et al. | | |
| 6,262,374 B1 * | 7/2001 | Matsumoto .......... | H02G 15/085 174/78 |
| 8,808,012 B2 * | 8/2014 | Omae .................. | H01R 13/648 439/98 |
| 11,181,197 B2 * | 11/2021 | Chikamatsu ......... | H01R 9/0524 |

FOREIGN PATENT DOCUMENTS

| | | |
|---|---|---|
| JP | H08138798 A | 5/1996 |

* cited by examiner

*Primary Examiner* — Ross N Gushi

(57) ABSTRACT

A shield wire assembly comprises a shield wire, a conductive ferrule, a wire seal and a stopper. The shield wire includes a central conductor and a braided shielding wire. The ferrule is conductively connected to, and adapted to ground, the braided shielding wire. The stopper is arranged between the ferrule and the wire seal, and includes a first stopper portion suppressing displacement of the ferrule in an inward radial direction and a second stopper portion suppressing displacement of the ferrule in a direction toward the wire seal.

20 Claims, 5 Drawing Sheets

SHIELD WIRE ASSEMBLY

CROSS-REFERENCE TO RELATED APPLICATIONS

This application claims the benefit of Japanese Patent Application No. 2022-124465, filed Aug. 4, 2022, the whole disclosure of which is incorporated herein by reference.

FIELD OF THE INVENTION

Embodiments of the present disclosure relate to a shield wire assembly including a wire seal or seal member for waterproofing.

BACKGROUND

According to the prior art, grounding methods for shield wires used in electrical machinery connectors, for example, utilize a shield contact that is pressure bonded with a braided wire. Specifically, according to the prior art, a connector includes a terminal, a contact that comes into contact with a metal shell when pressure bonded and connected with a shield braiding of a shield wire, and a waterproof seal member that is inserted onto an outer periphery of the shield wire.

When this structure is applied to a waterproof connector, a contact (e.g., a ferrule) needs to be disposed in the vicinity of the waterproof seal member (wire seal) for the purpose of reducing size. However, depending on the handling method such as pulling the wire or the like, the ferrule may move and come into contact with the wire seal, thus damaging the wire seal and impairing the waterproof performance. Further, prior art solutions often experience excessive displacement of portions of the ferrule, although the ferrule is grounded with elasticity due to the metal shell and the spring piece, impairing the connection.

Therefore, it is an object of the present disclosure to provide a shield wire assembly capable of preventing damages of the wire seal due to the movement of the ferrule and preventing excessive displacement of the ferrule within the assembly.

SUMMARY

According to an embodiment of the present disclosure, a shield wire assembly comprises a shield wire, a conductive ferrule, a wire seal and a stopper. The shield wire includes a central conductor and a braided shielding wire. The ferrule is conductively connected to, and adapted to ground, the braided wire. The stopper is arranged between the ferrule and the wire seal, and includes a first stopper portion suppressing displacement of the ferrule in an inward radial direction and a second stopper portion suppressing displacement of the ferrule in a direction toward the wire seal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
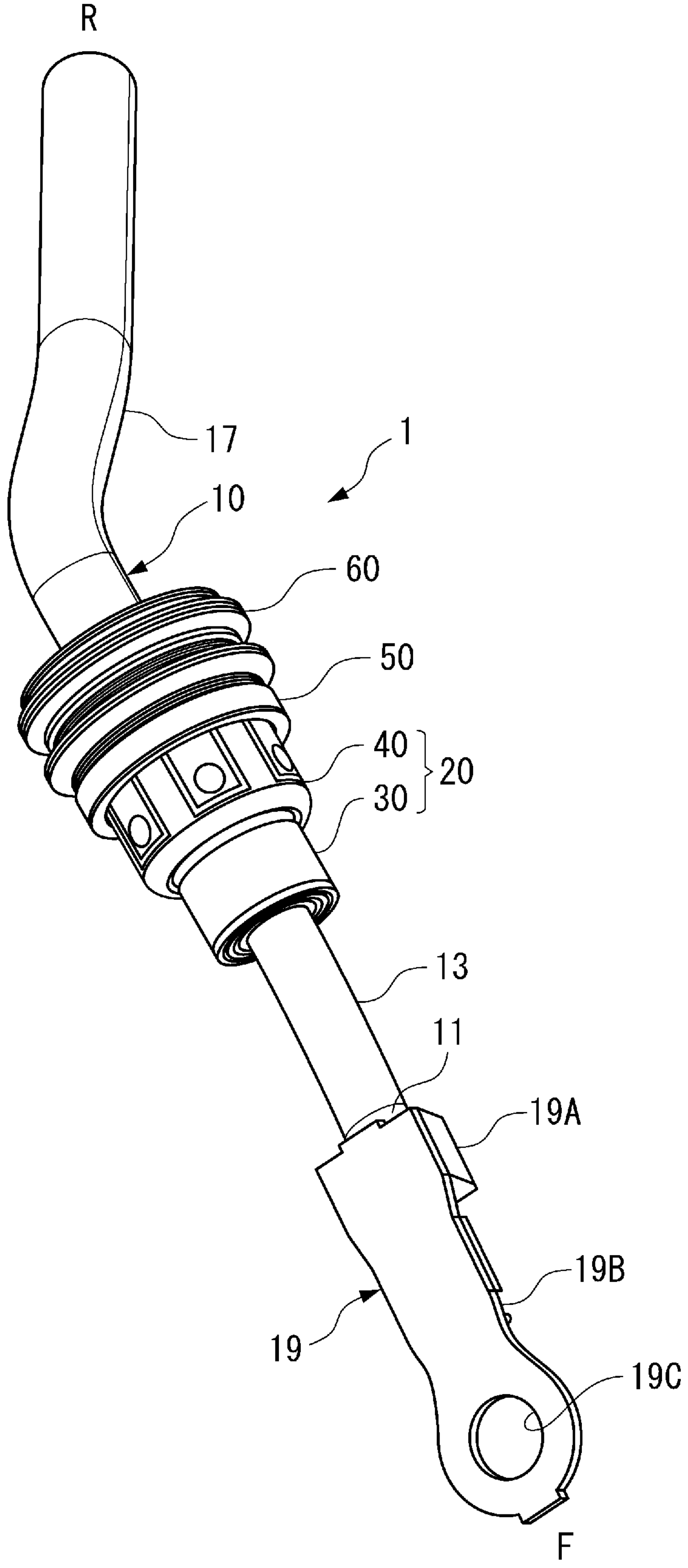
FIG. 1 is an isometric view illustrating a shield wire according to an embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As illustrated in FIG. 1, a shield wire assembly 1 includes a shield wire 10, a grounding element 20 for grounding of a braided wire assembled to the shield wire 10, and a wire seal 60 in which the shield wire assembly is mounted to an electrical connector, for example, for waterproofing. The shield wire assembly 1 includes a stopper 50 interposed between the grounding element 20 and the wire seal 60. The shield wire assembly 1 is adapted to prevent damage (e.g., scarring or scratching) in the wire seal 60 by including the stopper 50. In addition, the stopper 50 is adapted to prevent excessive displacement exceeding an elasticity limit from occurring in an elastic piece 44 of a ferrule 40.

Hereinafter, regarding the shield wire assembly 1, its elements will be described in order, and thereafter, the mounting state of the shield wire assembly 1 with respect to a housing 100 of the electrical connector, which is the mounting target, and two functions, the damage preventing function and the excessive displacement preventing function, by the shield wire assembly 1 will be described.

Figure 4:
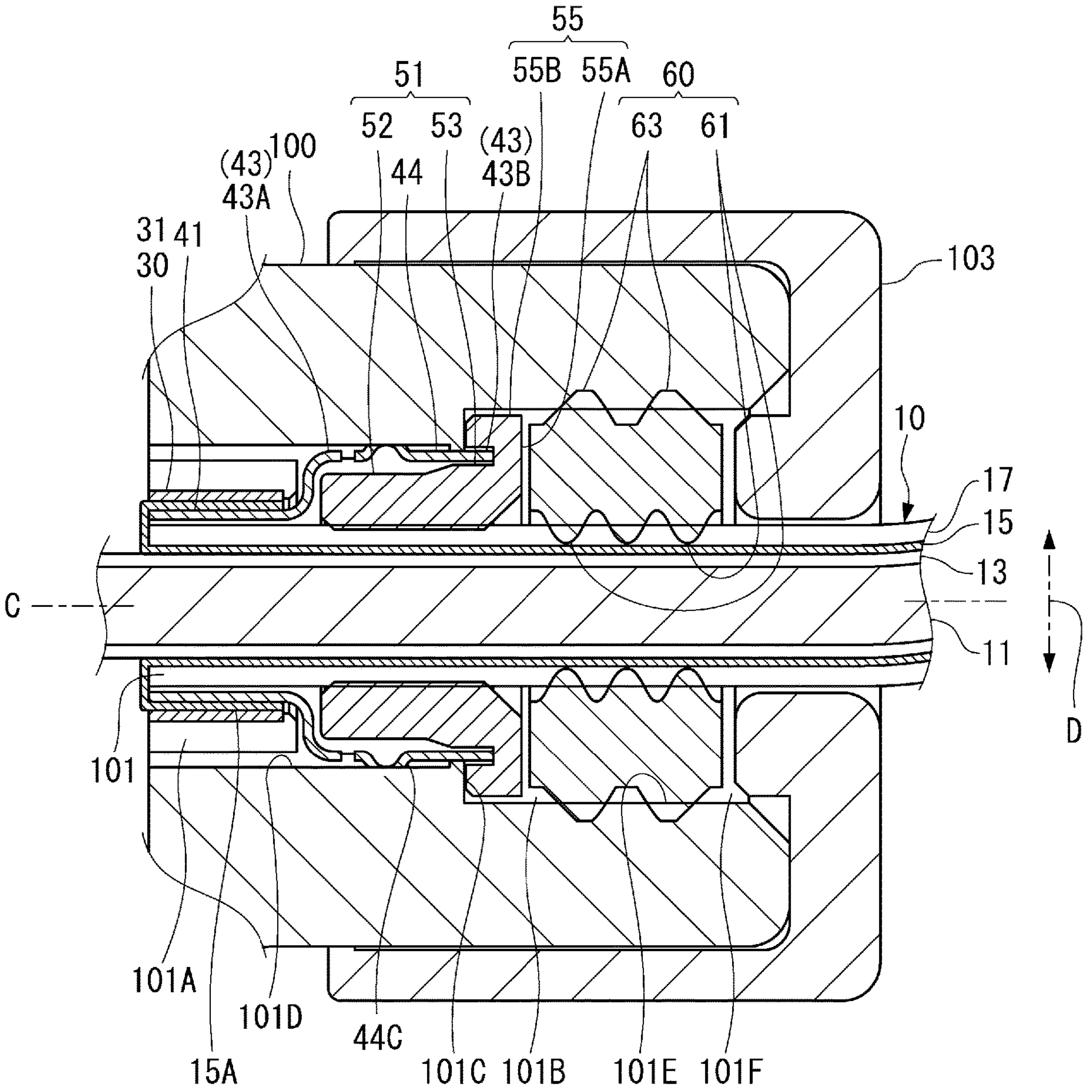
FIG. 4 is a cross sectional view illustrating the shield wire of FIG. 1 mounted on an electrical connector.

As illustrated in FIGS. 1 and 4, the shield wire 10 includes a core wire 11 having electrical conductivity, an inner layer covering 13 formed from an electrical insulating material that covers the periphery of the core wire, a braided wire 15 that covers the periphery of the inner layer covering, and an outer layer covering 17 that covers the periphery of the braided wire. The shield wire 10 has a terminal 19 electrically connected to the core wire 11. A side of the terminal 19 is defined as front side (F) and a side opposite to the terminal 19 is defined as rear side (R), as illustrated in FIG. 1 or the like. This definition has a relative meaning. For example, the wire seal 60 is assembled to the shield wire 10 in the rear side (R) of the stopper 50, and the stopper 50 is assembled to the shield wire 10 in the front side (F) of the wire seal 60.

The core wire 11 may be, for example, a stranded wire formed by twisting a plurality of metal strands, a conductor made of a single body having a solid structure, or the like or that in which such conductors are combined. For the material forming the core wire 11, for example, metal material having excellent electrical conductivity such as copper or copper alloy, aluminum or aluminum alloy, or the like can be used. This is similar for the metal strand of the braided wire 15.

The inner layer covering 13 covers, for example, the outer peripheral surface of the core wire 11 over the entire periphery. The inner layer covering 13 is, for example, formed from an electrical insulating material such as synthetic resin, and specifically, for example, synthetic resin having polyolefin based resin such as crosslinked polyethylene, crosslinked polypropylene or the like as a main component is used. The inner layer covering 13 may be formed from a single type of insulating material, or by appropriately combining a plurality of types of insulating materials in a plurality of layers by way of example.

The braided wire 15 has a tubular form that covers the outer periphery of the inner layer covering 13. For the braided wire 15, a braided wire in which a plurality of metal strands are knitted, or a braided wire in which metal strands and resin strands are knitted in combination can be used. The braided wire 15 has a portion exposed from the outer layer covering 17 folded back toward the rear side (R) at the end on the front side (F). A fold-back portion 15A is sandwiched between the ferrule 40 and a fixed body 30. As a result, the braided wire 15 is electrically connected with the ferrule 40. The outer layer covering 17 covers the entire region in the peripheral direction of the outer peripheral surface of the braided wire 15. The outer layer covering 17 is, for example, formed by an electrical insulating material similar to the inner layer covering 13.

The terminal 19 is connected to the distal end portion of the core wire 11 exposed from the inner layer covering 13. The terminal 19 includes a core wire connecting portion 19A responsible for connection with the core wire 11, and a counter connecting portion 19B integrally formed with the core wire connecting portion 19A and connected with a mating terminal (not illustrated). In the terminal 19, the core wire connecting portion 19A and the counter connecting portion 19B are integrally formed by, for example, stamping a plate material made of metal material excelling in electrical conductivity, and performing machine processing such as forming.

The core wire connecting portion 19A is, for example, also connected mechanically, in addition to being electrically connected with the core wire 11 through means such as pressure bonding and welding. The counter connecting portion 19B is formed with a fastening hole 19C penetrating in a plate thickness direction thereof for connection by fastening with the mating terminal. For example, electrical and mechanical connection with the mating terminal (not illustrated) are realized with a bolt (not illustrated) inserted into the fastening hole 19C.

Figure 2:
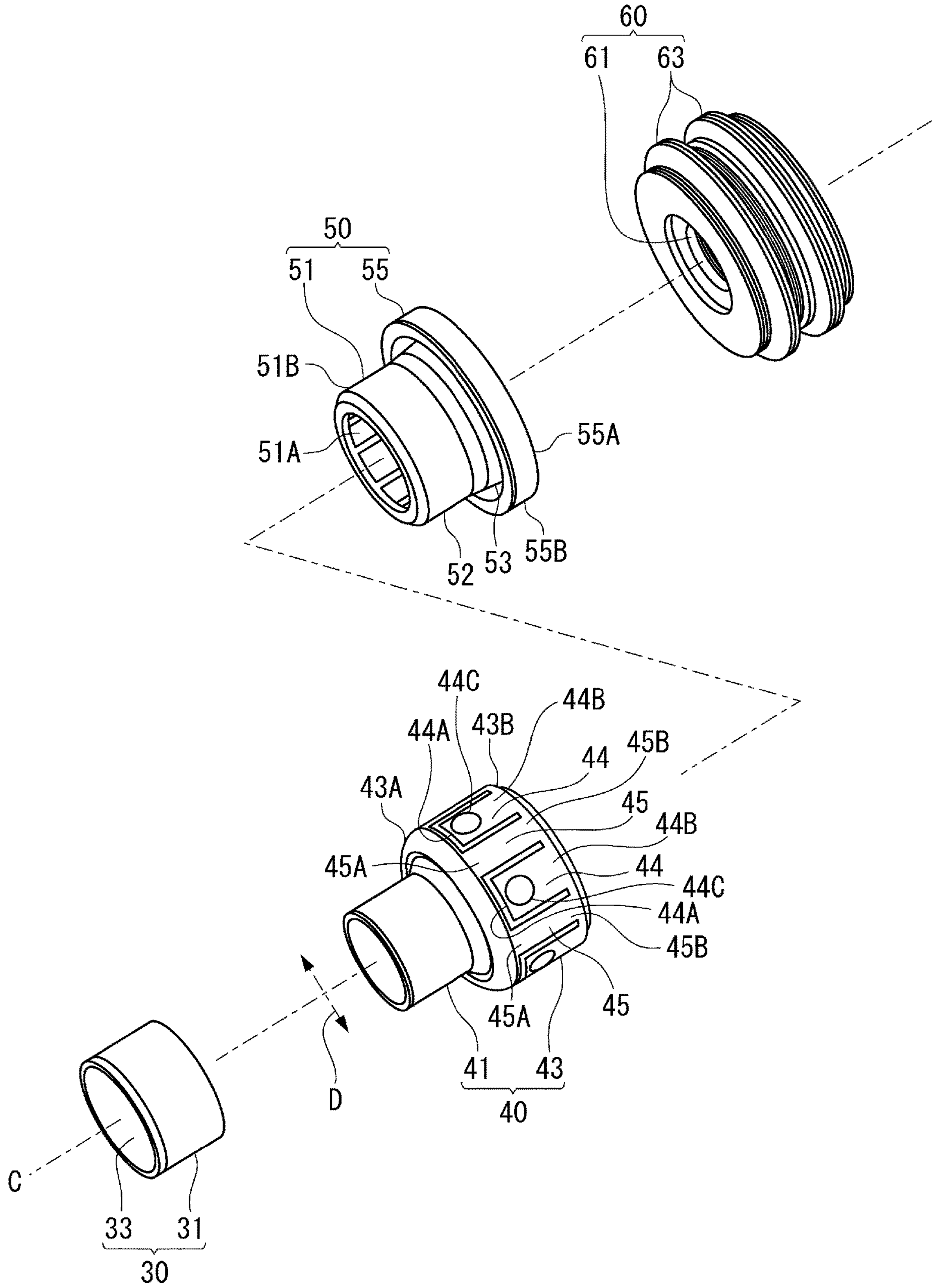
FIG. 2 is an exploded isometric view illustrating elements of a seal portion of the shield wire of FIG. 1.
Figure 5:
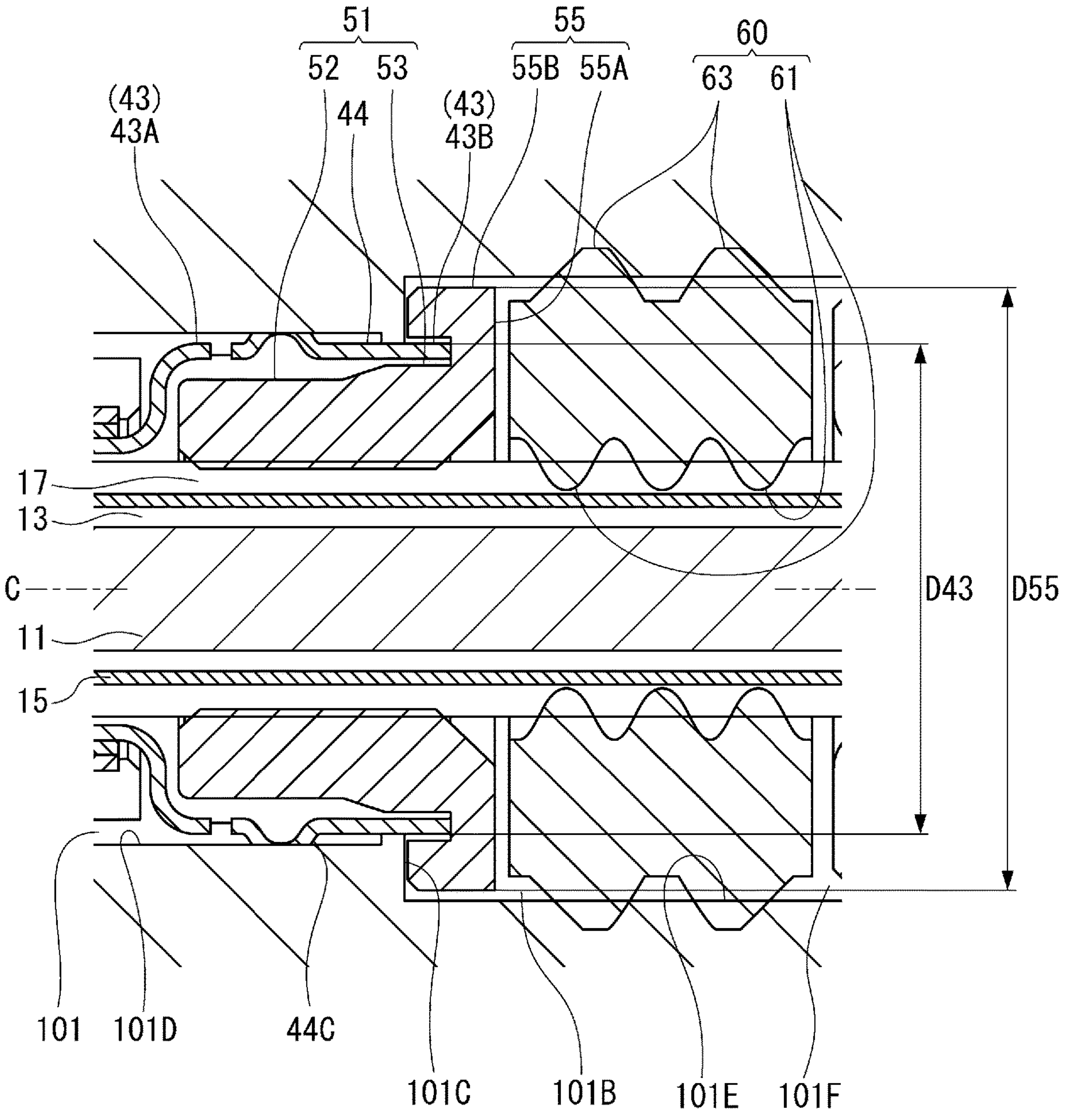
FIG. 5 is a partially enlarged view of FIG. 4.

As shown in FIGS. 2, 4, and 5, the grounding element 20 electrically connects the braided wire 15 of the shield wire 10 and the housing 100. The grounding element 20 includes the fixed body 30. The fixed body 30 fixes the ferrule 40 at a predetermined position of the shield wire 10, in addition to caulking or sealingly securing the fold-back portion 15A of the braided wire 15 to the ferrule 40. The ferrule 40 sandwiches the fold-back portion 15A of the braided wire 15 with the fixed body 30.

The fixed body 30 is mated with a pressure bonding portion 41 of the ferrule 40 from the outer side, and applies a load toward the inner side in the radial direction at an appropriate position in the peripheral direction, so that the pressure bonding portion 41 is caulked or sealed and mechanically restrained in a state of sandwiching the braided wire 15 in between. According to such a caulking, a stable electrical connection between the braided wire 15 and the ferrule 40 is ensured. In addition, the pressure bonding portion 41 is pressure bonded to the outer layer covering 17 of the shield wire 10, and the ferrule 40 is fixed at a predetermined position of the shield wire.

The material forming the fixed body 30 is not limited, and may be selected from an iron based, aluminum based, copper based metal material or the like. The fixed body 30 is typically formed as a cylindrical member, and includes a mating hole 31 where the pressure bonding portion 41 is interiorly located and a caulking or sealing ring 33 that surrounds the mating hole. The caulking ring 33 is embodied as the fixed body 30, but the form of the fixed body may be arbitrary as long as electrical connection with the braided wire 15 can be made in addition to fixing the pressure bonding portion 41 to the shield wire 10.

The ferrule 40 includes the pressure bonding portion 41 pressure bonded to the shield wire 10 at a predetermined position of the shield wire by being caulked by the fixed body 30, and a connecting portion 43 electrically connected to the housing 100. The pressure bonding portion 41 and the connecting portion 43 are respectively formed as an annular shape. However, the diameter of the pressure bonding portion 41 is relatively small. The pressure bonding portion 41 and the connecting portion 43 are integrally formed from a metal material having electrical conductivity similar to the fixed body 30. The ferrule 40 can be produced, for example, by bending a flat plate material to a circular ring shape. Furthermore, the ferrule 40 can be produced by preparing a circular tube of the same shape as the pressure bonding portion 41, and enlarging the diameter and shaping the portion corresponding to the connecting portion 43. The pressure bonding portion 41 has a simple circular tube shape by way of example.

The connecting portion 43 includes a front side supporting end 43A, a rear side supporting end 43B provided with a space in a direction of an axis line (C), and a plurality of elastic pieces 44 and a plurality of stationary pieces 45 provided between the front side supporting end and the rear side supporting end. When the ferrule 40 is mounted to the shield wire 10, the elastic piece 44 is positioned on the front side (F), and the rear side supporting end 43B is positioned on the rear side (R). The front side supporting end 43A and the rear side supporting end 43B are both formed in continuation in the peripheral direction.

Each of the elastic pieces 44 has a cantilever beam form in which the front side supporting end 43A side serves as a free end 44A, and the rear side supporting end 43B side serves as a fixed end 44B continuing to the rear side supporting end 43B. Each of the elastic pieces 44 is formed with a contact 44C responsible for direct connection with the housing 100. The contact 44C is formed to rise toward the outer side in the radial direction of the elastic piece 44. In the elastic piece 44, the lateral cross sectional view excluding the contact 44C, that is, the surface orthogonal to the axis line (C) has an arcuate form. This is the same for the stationary piece 45.

Each of the stationary pieces 45 has a double supported beam form in which the front side supporting end 43A side serves as a fixed end 45A continuing to the front side supporting end 43A, and the rear side supporting end 43B side serves as a fixed end 45B continuing to the rear side supporting end 43B. The stationary piece 45 may deform as it is a plate-like member made of metal material, or an elastic body, but is referred to as the stationary piece 45 as it is stationary in comparison with the elastic piece 44.

The plurality of elastic pieces 44 and the plurality of stationary pieces 45 are alternately provided in the peripheral direction between the front side supporting end 43A and the rear side supporting end 43B. Furthermore, the elastic piece 44 and the stationary piece 45 have an equal radial dimension from the axis line (C). The plurality of elastic pieces 44 and the plurality of stationary pieces 45 are alternately positioned on or in the arc.

A stopper 50 capable of being positioned between the fixed body 30 and the wire seal 60 and providing a damage preventing effect and an excessive displacement preventing effect will be described with reference to FIGS. 2-5. The stopper 50 includes a first cylindrical stopper 51 extending in the direction of the axis line (C), a second stopper 55 continuing to the first stopper 51 in the rear side (R) and projecting out to a flange shape on the outer side in the radial direction (D). The first stopper 51 and the second stopper 55 are integrally formed from rubber or resin material having electrical insulating property by way of example.

The first stopper 51 is provided to prevent the elastic piece 44 of the ferrule 40 from being excessively displaced toward the inner side in the radial direction (D) by being positioned between the outer layer covering 17 of the shield wire 10 and the ferrule 40. The first stopper 51 includes an inner peripheral surface 51A and an outer peripheral surface 51B. The first stopper 51 includes a displacement permitting portion 52 positioned on the front side (F) and a displacement regulating portion 53 positioned on the rear side (R) of the displacement permitting portion. The elastic piece 44 of the ferrule 40 is positioned in the displacement permitting portion 52 with a gap on the outer side in the radial direction (D). In the displacement regulating portion 53 is positioned, with a gap, the rear side supporting end 43B of the ferrule 40 on the outer side in the radial direction (D).

Figure 3:
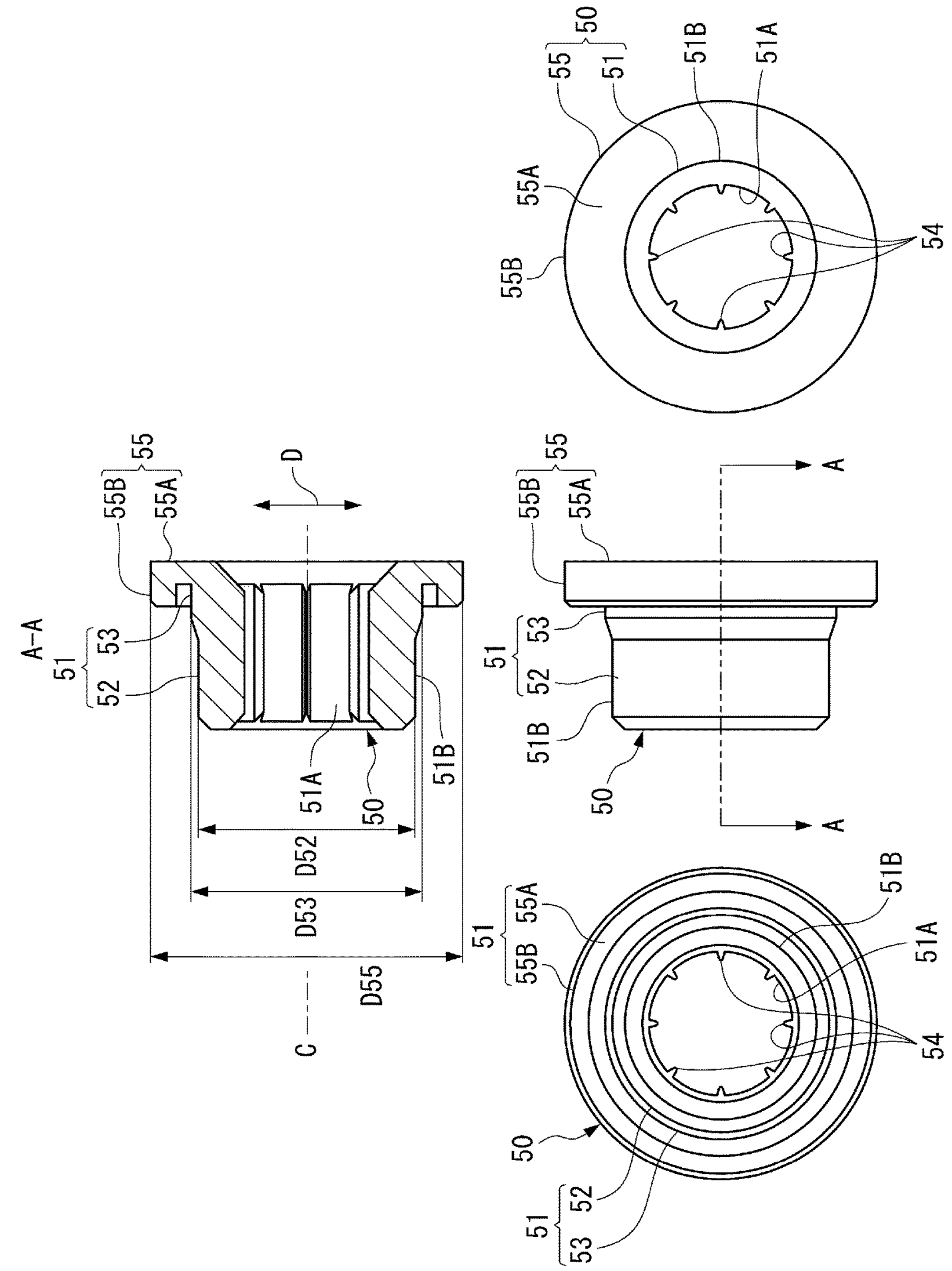
FIG. 3 is a trihedral view and a longitudinal cross sectional view illustrating a stopper of FIG. 2.

The outer diameter D52 of the displacement permitting portion 52 is formed smaller than the outer diameter D53 of the displacement regulating portion 53 (see FIGS. 3-5). As a result, the displacement by necessary and sufficient deflection toward the inner side in the radial direction (D) of the elastic piece 44 is permitted in the displacement permitting portion 52. Suppression of excessive movement in the radial direction (D) of the ferrule 40 in the displacement regulating portion 53 is provided by forming the outer diameter of the first stopper 51 in two stages. FIGS. 4 and 5, the elastic piece 44 is illustrated as if it is not deflected. A difference ΔD (ΔD=outer diameter D53−outer diameter D52) of the outer diameter D53 and the outer diameter D52 is set to correspond to the necessary and sufficient displacement given to the elastic piece 44.

A plurality of projections 54 extending in the direction of the axis line (C) are positioned at equal interval in the peripheral direction in the inner peripheral surface 51A of the first stopper 51. The distal end toward the inner side in the radial direction (D) of the projection 54 is pointed. When the shield wire 10 is mated to the inner side of the stopper 50, the projection 54 bites into the outer layer covering 17 of the shield wire, so that the relative position shift in the peripheral direction of the shield wire and the stopper can be prevented.

The second stopper 55 blocks the ferrule 40 from moving toward the wire seal 60 and exhibits the damage or scar preventing function of preventing the wire seal 60 from being damaged when the connecting portion 43 of the ferrule 40 is brought into contact by being positioned between the end on the rear side (R) of the connecting portion of the ferrule and the wire seal. To this end, the second stopper 55 is formed to satisfy D55≥D43, where D55 is the dimension in the radial direction (D) of the second stopper 55 (flange 55A) and D43 is the dimension in the radial direction of the connecting portion 43 (see FIG. 5).

The second stopper 55 includes the flange 55A projecting out from the end on the rear side (R) of the first stopper 51 toward the outer side in the radial direction (D), and a ring-shaped rib 55B extending from the end (distal end) in the radial direction (D) of the flange toward the front side (F) so as to be parallel to the first stopper. The flange 55A protects the wire seal 60 by having the ferrule 40 attempting to move toward the wire seal 60 collide thereto. The rib 55B restrains the displacement in the radial direction (D) of the connecting portion 43 and positions the connecting portion 43 by sandwiching the connecting portion of the ferrule 40 with the displacement regulating portion 53.

The wire seal 60 is provided between the housing 100 and the outer layer covering 17 of the shield wire 10, and is closely attached to both the housing and the outer layer covering, thus preventing moisture from entering inside the housing through the outer layer covering. The wire seal 60 includes a wire seal portion 61 closely attached to the outer peripheral surface of the outer layer covering 17 of the shield wire 10, and a housing seal portion 63 closely attached to the inner peripheral surface of the housing 100. The wire seal 60 is, for example, made from rubber material such as silicon rubber, nitrile rubber, and fluorine rubber.

As shown in FIGS. 4 and 5, the housing 100 includes a wire accommodating space 101 extending from the front side (F) toward the rear side (R), where the shield wire assembly 1 is accommodated in the wire accommodating space and configures one element in an electrical connector. Note that by way of example, the housing 100 is made from an electrically conductive metal material described above, typically aluminum alloy.

The wire accommodating space 101 includes, by way of example, a smaller space 101A positioned on the front side (F) and a larger space 101B positioned on the rear side (R) of the smaller space. The smaller space 101A and the larger space 101B are both made of circular column shaped cavity, but the larger space has a larger diameter than the smaller space. A step difference 101C is formed at the boundary of the smaller space 101A and the larger space 101B. An inner peripheral surface of the housing 100 facing the smaller space 101A configure an electric contact surface 101D to which the contact 44C of the elastic piece 44 of the ferrule 40 is electrically connected. The inner peripheral surface of the housing 100 facing the larger space 101B configure a seal surface 101E to which a housing seal portion 63 of the wire seal 60 is closely attached. The end on the rear side (R) of the larger space 101B is an opening 101F communicating to the outside, and the opening is closed by a fastener 103.

As shown in FIGS. 4 and 5, the shield wire assembly 1 is mounted to the wire accommodating space 101 of the housing 100. The grounding element 20 (fixed body 30, ferrule 40) and the stopper 50 are interiorly accommodated across the smaller space 101A and the larger space 101B.

In the smaller space 101A, the braided wire 15 and the ferrule 40 are electrically connected by sandwiching the fold-back portion 15A between the pressure bonding portion 41 of the ferrule 40 and the caulking ring 31 of the fixed body 30 between the braided wire 15. Furthermore, in the smaller space 101A, the necessary and sufficient displacement toward the inner side in the radial direction (D) of the elastic piece 44 at the periphery of the displacement permitting portion 52 is permitted.

In the larger space 101B, the displacement toward the inner side in the radial direction (D) is restrained by the displacement regulating portion 53 in which the rear side supporting end 43B is provided on the inner side thereof. In addition, the rear side supporting end 43B has the displacement on the outer side in the radial direction (D) restricted by the rib 55B. The contact 44C of the elastic piece 44 comes into contact with the electric contact surface 101D. Furthermore, the flange 55A is positioned on the rear side (R) of the rear side supporting end 43B. The rib 55B continuing to the distal end in the radial direction (D) of the flange 55A has the end on the front side (F) butting against the step difference 101C, so that the displacement toward the front side of the stopper 50 is restricted. The displacement toward the rear side (R) of the stopper 50 is restricted by the fastener 103 by way of the wire seal 60.

The shield wire assembly 1 has the following effects by including the stopper 50. The stopper 50 includes the first stopper 51 provided on the inner side of the ferrule 40. Therefore, according to the shield wire assembly 1, the excessive displacement preventing effect of preventing the ferrule 40 from making an excessive displacement toward the inner side in the radial direction (D) can be obtained. Furthermore, the stopper 50 includes the second stopper 55 on the rear side (R) of the rear side supporting end 43B of the ferrule 40. Therefore, according to the shield wire assembly 1, the ferrule 40 is displaced toward the rear side (R) and butts against the wire seal 60, and the damage or scar preventing effect of preventing scrapes from forming in the wire seal 60 can be obtained. In addition, the shield wire assembly 1 has two effects, the excessive displacement preventing effect and the scar preventing effect, by providing the stopper 50, which is a single member formed as one piece, and thus also has superiority in terms of cost.

As described above, preferred embodiments of the present invention have been described, but other than the embodiments described above, configurations described in the above embodiments can be selected or appropriately changed to other configurations as long as they are not deviated from the general concepts of the present invention. For example, in a preferred form, the stopper 50 has the first stopper 51 having the excessive displacement preventing function and the second stopper 55 exhibiting the scar preventing function integrally formed, but the present invention is not limited thereto. A member corresponding to the first stopper 51 and a member corresponding to the second stopper 55, which are individually produced, may be positioned at positions in the shield wire assembly 1 corresponding to the first stopper and the second stopper, respectively. Further, while the connecting portion 43 of the ferrule 40 includes the elastic piece 44 of cantilever beam form, but may also be a simple cylindrical form. In this form as well, the contact 44C or a site corresponding to the contact 44C is preferably provided to reliably obtain the electrical connection with the electric contact surface 101D of the housing 100.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A shield wire assembly, comprising:
a shield wire including a braided wire;
a conductive ferrule adapted to ground the braided wire;
a wire seal adapted to form a seal with the shield wire; and
a stopper made from an electrical insulating material and assembled between the ferrule and the wire seal, the stopper having:
a first stopper portion suppressing displacement of the ferrule in an inward radial direction; and
a second stopper portion suppressing displacement of the ferrule in a direction toward the wire seal, the second stopper portion defining a flange projecting in an outward radial direction, a diameter of the flange being greater than a diameter of the ferrule.

2. The shield wire assembly according to claim 1, wherein the first stopper portion comprises a cylindrical shape.

3. The shield wire assembly according to claim 2, wherein the second stopper portion is arranged at an end of the first stopper portion.

4. The shield wire assembly according to claim 3, wherein the first stopper portion and the second stopper portion are integrally formed.

5. The shield wire assembly according to claim 3, wherein the first stopper portion includes a displacement permitting portion adapted to permit an elastic piece of the ferrule to be displaced in the inward radial direction toward the shield wire.

6. The shield wire assembly according to claim 5, wherein the first stopper portion further includes a displacement regulating portion adapted to prevent displacement of the ferrule in the inward radial direction.

7. The shield wire assembly according to claim 6, wherein an outer diameter of the displacement permitting portion is less than an outer diameter of the displacement regulating portion.

8. The shield wire assembly according to claim 6, further comprising a ring-shaped rib extending parallel to the first stopper portion from an end of the flange in an axial direction of the assembly, the ferrule arrange between the rib and the displacement regulating portion.

9. The shield wire assembly according to claim 8, wherein the ferrule contacts an inner surface of the rib and the displacement regulating portion in the outward radial direction and the inward radial direction, respectively.

10. The shield wire assembly according to claim 5, wherein the first stopper portion is arranged within the ferrule, and the displacement permitting portion of the first stopper portion defines a gap in the outward radial direction between an outer surface of the displacement permitting portion and an inner surface of the ferrule.

11. An electrical connector, comprising:

a connector housing defining a wire accommodation space; and a shield wire assembly insertable into the wire accommodation space in a first axial direction, including:

a shield wire extending in the first axial direction and including a braided wire;

a conductive ferrule adapted to ground the braided wire;

a wire seal adapted to form a seal with the shield wire; and a stopper made from an electrical insulating material and assembled between the ferrule and the wire seal, the stopper having:

a first stopper portion suppressing displacement of the ferrule in an inward radial direction, including:

a displacement permitting portion including permitting an elastic element of the ferrule to be displaced in the inward radial direction toward the shield wire; and a displacement regulating portion preventing displacement of the ferrule in the inward radial direction; and a second stopper portion suppressing displacement of the ferrule in a direction toward the wire seal.

12. The electrical connector according to claim 11, wherein the second stopper portion is arranged at an end of the first stopper portion and comprises a flange projecting in an outward radial direction.

13. The electrical connector according to claim 12, wherein the flange abuts an internal wall of the connector housing defining the wire accommodation space in the first direction.

14. The electrical connector according to claim 13, wherein the wire accommodation space includes a first section having a first internal diameter, and a second section having a second internal diameter greater than the first internal diameter, the first stopper portion is arranged within the first section of the wire accommodation space and the second stopper portion is arranged within the second section of the wire accommodation space.

15. The electrical connector according to claim 14, wherein the wire seal is arranged within the second section of the wire accommodation space and sealingly contacts an exterior surface of the shield wire and an internal surface of the wire accommodation space.

16. The electrical connector according to claim 11, wherein an outer diameter of the displacement permitting portion is less than an outer diameter of the displacement regulating portion.

17. The electrical connector according to claim 11, further comprising a ring-shaped rib extending in the first axial direction and parallel to the first stopper portion from an end of the flange, a first portion of the ferrule arrange between the rib and the displacement regulating portion of the stopper.

18. The electrical connector according to claim 17, therein the first portion of the ferrule contacts an inner surface of the rib and the displacement regulating portion of the stopper in the outward radial direction and the inward radial direction, respectively.

19. A shield wire assembly, comprising:

a shield wire including a braided wire;

a conductive ferrule adapted to ground the braided wire;

a wire seal adapted to form a seal with the shield wire; and a stopper made from an electrical insulating material and assembled between the ferrule and the wire seal, the stopper having:

a first stopper portion suppressing displacement of the ferrule in an inward radial direction, the first stopper portion including a displacement permitting portion adapted to permit an elastic piece of the ferrule to be displaced in the inward radial direction toward the shield wire; and a second stopper portion suppressing displacement of the ferrule in a direction toward the wire seal.

20. An electrical connector, comprising:

a connector housing defining a wire accommodation space; and a shield wire assembly insertable into the wire accommodation space in a first axial direction, including:

a shield wire extending in the first axial direction and including a braided wire;

a conductive ferrule adapted to ground the braided wire;

a wire seal adapted to form a seal with the shield wire; and a stopper made from an electrical insulating material and assembled between the ferrule and the wire seal, the stopper having:

a first stopper portion suppressing displacement of the ferrule in an inward radial direction; and a second stopper portion suppressing displacement of the ferrule in a direction toward the wire seal, the second stopper portion including a flange projecting in an outward radial direction, the flange abutting an internal wall of the connector housing defining the wire accommodation space in the first axial direction.

* * * * *